(12) United States Patent
DeYoe et al.

(10) Patent No.: US 7,788,075 B2
(45) Date of Patent: Aug. 31, 2010

(54) SYSTEM AND METHOD FOR SENSORY DEFECT SIMULATION

(75) Inventors: Edgar A. DeYoe, Delafield, WI (US); John L. Ulmer, Brookfield, WI (US); Rachael A. Kirchhoff, Milwaukee, WI (US)

(73) Assignee: MCW Research Foundation, Milwaukee, WI (US)

( * ) Notice: Subject to any disclaimer, the term of this patent is extended or adjusted under 35 U.S.C. 154(b) by 1052 days.

(21) Appl. No.: 11/203,754

(22) Filed: Aug. 15, 2005

(65) Prior Publication Data

US 2006/0058619 A1 Mar. 16, 2006

Related U.S. Application Data

(60) Provisional application No. 60/602,030, filed on Aug. 16, 2004.

(51) Int. Cl.
*G06F 7/60* (2006.01)
*A61F 5/24* (2006.01)

(52) U.S. Cl. ........................................ 703/11; 128/97.1

(58) Field of Classification Search ........................ None
See application file for complete search history.

(56) References Cited

OTHER PUBLICATIONS

Kollias et al. Functional evaluation using magnetic resonance imaging of the visual cortex in patients with retrochiasmatic lesions Journal of Neurosurgery vol. 89 pp. 780-790 (1998).*

Monheit et al. Radionecrosis of the Inferior Occipital Lobes With Altitudinal Visual Field Loss After Gamma Knife Radiosurgery Journal of Neuro-Opthalmology vol. 24, pp. 195-199 (2004).*

Blume et la. Epilepsy Surgery in the Posterior Cortex Annals of Neurology, vol. 29, pp. 638-645 (1991).*

J.H. Bertera, The effect of simulated scotomas on visual search in normal subjects, Investigative Opthamology & Visual Science, vol. 29, p. 470-475, 1988.

H.D. Crane and D.H. Kelly, Accurate simulation of visual scotomas in normal subjects, Applied Optics, vol. 22, pp. 1802-1806, 1983.

H.D. Crane and C.M. Steele, Generation V-dual-Purkinje-image eyetracker, Applied Optics, vol. 24, p. 527-537, 1985.

V.S. Ramachandran & R.L. Gregory, Reprinted from Nature, vol. 350, No. 6320, pp. 699-702, Apr. 25, 1991.

L. Pessoa and P. Deweerd, Filling-in from perceptual completion to cortical reorganization, New York, Oxford University Press 2003, pp. xii-xiv.

* cited by examiner

*Primary Examiner*—John S Brusca
(74) *Attorney, Agent, or Firm*—Quarles & Brady LLP (57) ABSTRACT

A visual defect simulation system receives a functional field map produced by an MRI system that relates locations in a patient's brain to locations in the patient's field of view. Planned medical operations are indicated at locations in the patient's brain and any resulting vision loss is simulated with a revised functional field map. A scene is displayed and an impairment overlay is produced from the revised functional field map that blocks the scene at locations corresponding to simulated vision loss. The overlay is translated over the scene in response to viewer eye movements detected by a vision-tracking system to present a real-time simulation of the resulting vision loss.

20 Claims, 9 Drawing Sheets

242 — THIS IS AN EXAMPLE OF WHAT THE
PATIENT WILL SEE WHEN USING THE
VISUAL DEFECT SIMULATOR. THE
SCOTOMA WILL MOVE ACROSS
VARIOUS REGIONS OF THE DISPLAY AS
240 — THE SUBJECT MOVES THEIR EYES. IN
ORDER TO ACHIEVE A REALISTIC
SIMULATION THE SCOTOMA NEEDS TO
REMAIN ABSOLUTELY FIXED RELATIVE
TO THE PATIENTS RETINA

FIG. 8a

THIS IS AN EXAMPLE OF WHAT THE
PATIENT WILL SEE WHEN USING THE
VISUAL DEFECT SIMULATOR. THE
SCOTOMA WILL MOVE ACROSS
VARIOUS REGIONS OF THE DISPLAY AS
THE SUBJECT MOVES THEIR EYES. IN
ORDER TO ACHIEVE A REALISTIC
SIMULATION THE SCOTOMA NEEDS TO
REMAIN ABSOLUTELY FIXED RELATIVE
TO THE PATIENTS RETINA

SYSTEM AND METHOD FOR SENSORY DEFECT SIMULATION

CROSS-REFERENCE TO RELATED APPLICATIONS

This application is based on U.S. Provisional Patent Application Ser. No. 60/602,030 filed on Aug. 16, 2004, and entitled "SENSORY DEFECT SIMULATOR AND PHYSICIAN INTERFACE".

STATEMENT REGARDING FEDERALLY SPONSORED RESEARCH

This invention was made with government support under Grant No. NIH RO1 EY10244, Grant No. NIH EB00843, Grant No. NIH EY13801, and Grant No. NIH RR00058, awarded by the National Institute of Health as well as U.S. Department of Education GAANN Fellowship. The United States Government has certain rights in this invention.

BACKGROUND OF THE INVENTION

The present invention relates generally to a visual defect simulation (VDS) system and, more particularly, to a system and method for simulating potential, patient-specific, visual field defects that may result from a prescribed process.

Scotomata, regions of blindness in the visual field, can be caused by injury to a portion of the visual system. For example, the treatment of tumors and arteriovenous malformations in the occipital cortex and therapeutic temporal lobectomy for relief of epilepsy can result in scotomata as a side-effect. Depending on the extent and location of cortical damage, the resultant scotomata can severely impact various activities of daily living. The effects of a particular scotoma can be difficult to imagine without direct experience, especially since a scotoma is retinopically fixed, that is, it moves with the eyes. Moreover, small or peripheral scotomata can go undetected by the patient. For example, the naturally occurring blind spot, where the optic nerve passes through the retina, is difficult for most people to detect without special instruction. However, when scotomata occur nearer to the center of gaze, the loss of even a few degrees of visual angle can have a very noticeable effect. In these cases, patients may find that the scotomata significantly affects activities such as reading or driving. Such losses of visual function can profoundly affect an individual's personal and professional life. Reading, which depends on high acuity central vision, is critically sensitive to foveal scotomata. Furthermore, more extensive peripheral scotomata may preclude safe driving and other activities such as biking, skiing, or walking in crowded public areas and, in some cases, may even lead to depression.

In clinical practice, it is acknowledged that invasive surgical procedures involving cortical visual pathways can sometimes cause partial vision loss as a side-effect. To date, there are no widely accepted procedures for predicting such side-effects or for simulating the predicted vision defect for a patient who must make critical decisions about the desirability of surgery or surgical extent versus the resulting quality of life due to potential visual defect.

The overall task of creating a system for scotoma prediction and simulation involves several challenges. For example, in order to present a realistic and clinically useful simulation, the unique retinotopic organization of visual cortex in and around a potential site of pathology should be precisely measured for each patient, individually. Next, this information should be combined with a proposed treatment plan in order to predict any regions of induced vision loss. Furthermore, the predicted field loss should be simulated in a realistic manner. Ultimately the accuracy of the prediction should be verifiable by comparing the predicted pattern of vision loss with the actually observed pattern of vision loss in individual patients.

A few scotoma simulators have been developed but are generally unable to meet these requirements. For example, some visual defect simulators have been created that used one or two-dimensional image-stabilizing systems to simulate a vision defect. However, these systems do not account for the unique retinotopic organization of each patient's visual cortex nor do they account for the effects of a particular plan for brain surgery. Therefore, while these systems may present a fairly realistic simulation of a defect in a patient's visual field, the simulation does not allow the patient to experience a potential/predicted visual defect that is specific to the patient and a proposed form of treatment. That is, the simulation does not provide any individualized, patient-specific information about the potential consequences of a proposed medical procedure.

The advent of functional magnetic resonance imaging (fMRI) provides a potential solution to these problems. Conventional fMRI detects changes in cerebral blood volume, flow, and oxygenation that locally occur in association with increased neuronal activity induced by a sensory, motor or cognitive task. As described in U.S. Pat. No. 5,603,322, an MRI system can be used to acquire signals from the brain over a period of time. As the brain performs a task, these signals are modulated synchronously with task performance to reveal which regions of the brain are involved in performing the task. Much research has been done to identify tasks, such as specific visual stimulations, that stimulate brain functions that are readily amenable to fMRI detection.

In this regard, functional magnetic resonance imaging has been used to create cortical maps of the retinotopic organization of human visual cortex. As described by DeYoe et al. in "Functional Magnetic Resonance Imaging (fMRI) Of The Human Brain", Journal of Neuroscience Methods, 54 (1994) 171-187, an fMRI scan sequence can be performed while providing a visual stimulation to the subject. Specifically, an optical system can be employed to provide a visual stimulus that changes in a prescribed manner during an FMRI scan sequence. Different regions of the retina can be stimulated and the regions in the visual cortex that respond can be measured by fMRI images and then mapped.

For each patient, fMRI can be used to map the unique functional topography (retinotopy) of visual cortex in and near a potential site of surgery. Using this information, it is possible to predict what portions of the visual field are likely to be affected by a particular surgical approach. Even with this estimate, it can still be difficult to verbally describe how this will affect the patient.

It would be desirable to have a system and method to provide a subject with a first-hand, simulated experience of a potential/predicted visual defect that is specific to the subject and the proposed form of treatment.

SUMMARY OF THE INVENTION

The present invention overcomes the aforementioned drawbacks by providing system and method for simulating potential, patient-specific, visual field defects. More particularly, an fMRI scan is performed in which the patient is visually stimulated in accordance with a prescribed vision test and a time course image data set is acquired, to produce a functional field map indicative of the patient's vision capability within the field of view. Perceptual vision deficits are predicted from the functional field map as a result of proposed changes to the brain and are presented to a subject through a Visual Defect Simulator (VDS) system to allow the subject to gain first-hand experience of the predicted vision defect.

In accordance with one aspect of the invention, a visual defect simulation system is disclosed that includes a user input configured to receive parameters indicating a proposed medical treatment to be performed on a patient and a video display configured to display an image to the patient. The visual defect simulation system includes a computer system configured to predict at least one visual defect that will result from the medical treatment and augment the image to simulate the at least one visual defect.

In accordance with another aspect of the invention, a visual defect simulation system is disclosed that includes a user input configured to receive a potential augmentation of a patient and a display configured to display an image to the patient. The visual defect simulation system also includes a processor configured to adjust the image to simulate a predicted visual defect that will be caused by the potential augmentation of the patient and adjust the image over time to retinopically fix the predicted visual in the patient's field of view.

In accordance with yet another aspect of the invention, a method of simulating a potential visual defect is disclosed that includes generating a representation of a portion of a patient's brain, inputting parameters of a desired process to be performed on the patient's brain, and predicting a potential visual defect that will result from the desired process. The method also includes displaying a representation of the potential visual defect and dynamically adjusting the representation of the potential visual defect to simulate the potential visual defect for a subject in real-time.

In accordance with still another aspect of the invention, a visual defect simulation system is disclosed that includes means for inputting parameters of a desired process to be performed on a portion of a subject and means for predicting a potential visual defect that the subject will experience as a result of the desired process. The visual defect simulation system also includes means for providing a real-time simulation of the potential visual defect that the subject is predicted to experience as a result of the desired process.

Various other features and advantages of the present invention will be made apparent from the following detailed description and the drawings.

DETAILED DESCRIPTION OF THE PREFERRED EMBODIMENT

Figure 1:
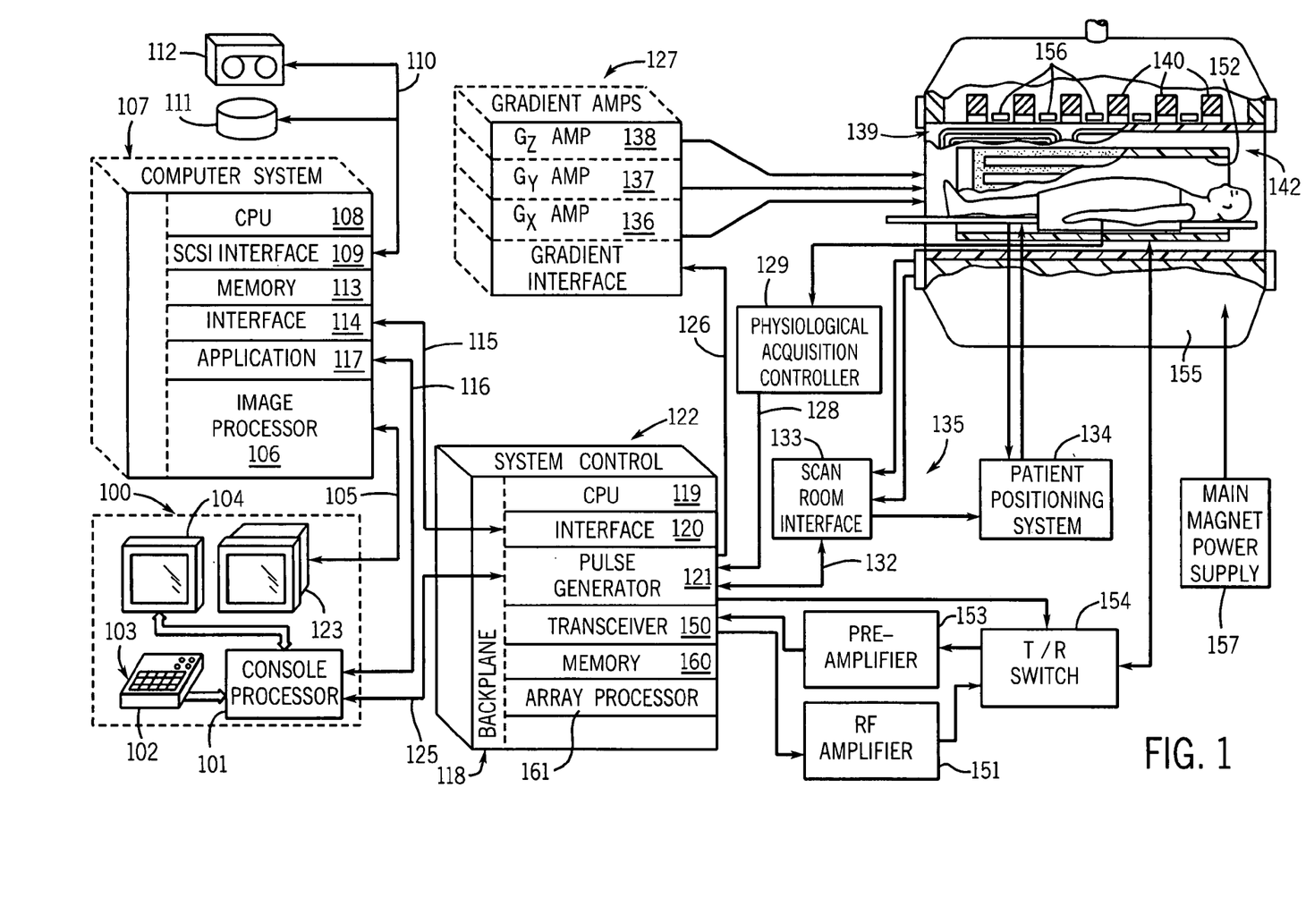
FIG. 1 is a block diagram of an MRI system for use with the present invention.

Referring to FIG. 1, the major components of an exemplary MRI system for use with the present invention are shown. The operation of the system is controlled from an operator console 100 which includes a console processor 101 that receives input from a plurality of input devices. In particular, according to the illustrated embodiment, the operator console 100 includes a keyboard 102, a control panel 103, and a plasma display/touch screen 104. The console processor 101 communicates through a communications link 116 with an applications interface module 117 in a separate computer system 107. Through the keyboard 102 and control panel 103, an operator controls the production and display of images by an image processor 106 in the computer system 107, which connects directly to a video 123 on the operator console 100 through a video cable 105.

The computer system 107 includes a backplane bus that, preferably, conforms with the VME standards. The computer system 107 also includes a number of modules that communicate with each other through this backplane. In addition to the application interface module 117 and the image processor 106, a CPU module 108 is included that controls the backplane and a SCSI interface module 109 that connects the computer system 107 through a bus 110 to a set of peripheral devices. According to the illustrated embodiment, the peripherals include a disk storage 111 and a tape drive 112. The computer system 107 also includes a memory module 113, known in the art as a frame buffer for storing image data arrays, and a serial interface module 114 that links the computer system 107 through a high speed serial link 115 to a system interface module 120, which, in the illustrated embodiment, is located in a separate system control 122.

The system control 122 includes a series of modules that are connected together by a common backplane 118. The backplane 118 includes of a number of bus structures, including a bus structure that is controlled by a CPU module 119. The serial interface module 120 connects this backplane 118 to the high speed serial link 115 and the pulse generator module 121 connects the backplane 118 to the operator console 100 through another serial link 125. It is through this serial link 125 that the system control 122 receives commands from the operator to indicate the scan sequence that is to be performed.

In operation, the pulse generator module 121 operates the system components to carry out the desired scan sequence. That is, the pulse generator module 121 produces data that indicates the timing, strength, and shape of the RF pulses that are to be produced and the timing and length of the data acquisition window. The pulse generator module 121 is also connected through a serial link 126 to a set of gradient amplifiers 127 to convey data indicating the timing and shape of the gradient pulses that are to be produced during the scan from the pulse generator module 121 to the gradient amplifiers 127.

The pulse generator module 121 also receives patient data through a serial link 128 from a physiological acquisition controller 129. The physiological acquisition control 129 can receive a signal from a number of different sensors connected to the imaging subject. For example, the physiological acquisition controller 129 may receive ECG signals from electrodes or respiratory signals from a bellows and provide feedback to the pulse generator module 121 to produce pulses that synchronize the scan with the cardiac cycle and/or respiratory cycle of the imaging subject. Furthermore, the pulse generator module 121 is connected through a serial link 132 to a scan room interface circuit 133 that receives signals via inputs 135 from various sensors associated with the position and condition of the imaging subject and the magnet system. It is also through the scan room interface circuit 133 that an imaging subject positioning system 134 receives commands to move the patient cradle and transport the imaging subject to a desired position for, or during, a scanning process.

The gradient waveforms produced by the pulse generator module 121 are applied to a gradient amplifier system 127 including $G_x$, $G_y$ and $G_z$ amplifiers 136, 137 and 138, respectively. Each amplifier 136, 137 and 138 is utilized to excite a corresponding gradient coil in a gradient coil assembly generally designated 139. The gradient coil assembly 139 forms part of an overall magnet assembly 155 that also includes a polarizing magnet 140, which, according to one embodiment, is a 1.5 Tesla magnet configured to impress a polarizing field extending horizontally through a bore. The gradient coil assembly 139 encircles the bore and, when energized, generates magnetic fields in the same direction as the main polarizing magnetic field but with gradients $G_x$, $G_y$, and $G_z$ directed in the orthogonal x-, y-, and z-axis directions of a Cartesian coordinate system. That is, if the magnetic field generated by the main magnet 140 is directed in the z-axis direction and is termed BO, and the total magnetic field in the z-axis direction is referred to as $B_z$, then $G_x$=differential. $B_z$/differential. x, $G_y$=differential. $B_z$/differential. y and $G_z$=differential. $B_z$/differential. z, and the magnetic field at any point (x, y, z) in the bore of the magnet assembly 141 is given by B(x, y, z)=BO+Gx x+Gy yGz z. The gradient magnetic fields are utilized to encode spatial information into the MR signals emanating from the subject being scanned. As will be described, according to one embodiment of the invention, an echo-planar imaging (EPI) sequence is used during the imaging process. Because the gradient fields are switched at a very high speed when an EPI sequence is used, local gradient coils (not shown) and, specifically, local head coils may be preferably employed in place of the whole-body gradient coils 139. This enables the inductance of the local gradient coils to be reduced and the gradient switching rates to be increased for the desired EPI sequence. For a description of one particular local gradient coil see U.S. Pat. No. 5,372,137 issued on Dec. 13, 1994, and entitled "NMR LOCAL COIL FOR BRAIN IMAGING", which is incorporated herein by reference.

Located within the bore 142 is a circular cylindrical whole-body RF coil 152. The RF coil 152 produces a circularly polarized RF field in response to RF pulses provided by a transceiver module 150 in the system control 122. These pulses are amplified by an RF amplifier 151 and coupled to the RF coil 152 by a transmit/receive switch 154 which forms an integral part of the overall RF coil assembly. Waveforms and control signals are provided by the pulse generator module 121 and utilized by the transceiver module 150 for RF carrier modulation and mode control. The resulting MR signals radiated by the excited nuclei in the imaging subject may be sensed by the RF coil 152 and coupled through the transmit/receive switch 154 to a preamplifier 153. The amplified MR signals are demodulated, filtered, and digitized in the receiver section of the transceiver 150.

The transmit/receive switch 154 is controlled by a signal from the pulse generator module 121 to electrically connect the RF amplifier 151 to the coil 152 during the transmit mode and connect the preamplifier 153 during the receive mode. The transmit/receive switch 154 also enables the aforementioned separate local RF head coil to be used in the transmit and receive mode to improve the signal-to-noise ratio of the received MR signals. With currently available MR systems such a local RF coil is advantageously employed in order to detect small variations in the MR signal produced by brain functions.

In addition to supporting the polarizing magnet 140, the gradient coils 139, and the RF coil 152, the magnet assembly 155 also supports a set of shim coils 156 associated with the main magnet 140 and used to correct inhomogeneities in the polarizing magnet field. A main power supply 157 is utilized to bring the polarizing field produced by the superconductive main magnet 140 to the proper operating strength and can then be removed.

The MR signals picked up by the RF coil are digitized by the transceiver module 150 and transferred to a memory module 160 which is also part of the system control 122. When the scan is completed and an entire array of data has been acquired in the memory modules 160, an array processor 161 performs a Fourier transform to the acquired data to generate an array of image data. The image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the video display 123 as will be described in more detail hereinafter.

According to the present invention, the above-described MRI system is used to perform an fMRI scan that, as will be described, can be used to produce a functional field map (ffmap) indicating all the locations in the subject's field of view which produce visually evoked brain activity in the visual cortex. That is, a cortical mapping is performed using the fMRI process, which can then be displayed in a unique format as a "back-projection" onto a diagram of the patient's visual field or, as will be described, can be augmented and displayed in a VDS system to provide the subject a simulation of the patient-specific, visual field defects that would potentially result from the augmentations. Furthermore, as will be described, the ffmap thus provides the link between the cortical pattern of visual activation and the patient's visual field and can be used by a VDS system to provide a patient-specific simulated scotoma in the patient's actual visual field. Therefore, this VDS system can provide a succinct, easily interpretable picture of the pattern of visual impairment within the subject's field of view.

For a description of one system and method for producing such an ffmap see U.S. Pat. No. 6,430,431 issued on Aug. 6, 2002, and entitled "MRI SYSTEM FOR MEASURING VISION CAPABILITIES", which is incorporated herein by reference. As described therein, visual stimulation of the imaging subject is achieved using a patient video system, such as described in U.S. Pat. No. 5,339,813, issued Aug. 23, 1994, and entitled "PATIENT VIDEO SYSTEM FOR MEDICAL IMAGING EQUIPMENT", which is also incorporated herein by reference.

Figure 2:
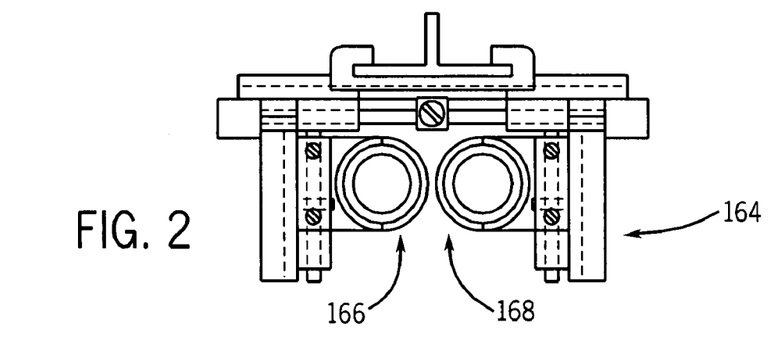
FIG. 2 is an end view of a scope used to provide visual stimulation to the patient during an imaging process performed with the MRI system of FIG. 1.
Figure 3:
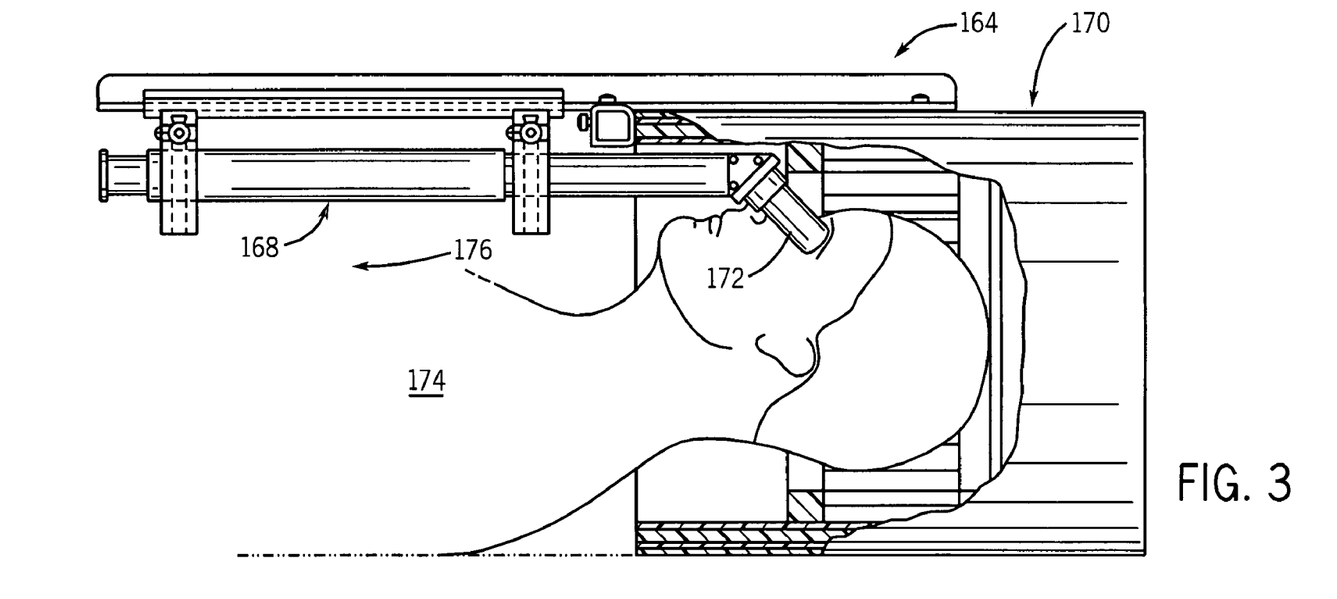
FIG. 3 is a side elevational view of the scope in FIG. 2.

For example, referring now to FIGS. 2 and 3, a video system 164 includes a pair of scopes 166 and 168 that are mounted to a local coil assembly 170 and positioned with a pair of eyepieces 172 against the eyes of an imaging subject 174. As shown, the scopes 166 and 168 pass between the patient's face and the closely surrounding head coil 170 and extend a substantial distance along a bore axis 176 to a target area (not shown) located remotely from the local coil assembly 170. According to one embodiment, the target is at least sixteen feet from the local coil assembly 170 so that conventional electronic and optical technologies can be employed without interference or image distortion from the high magnetic fields generated in association with the desired fMRI process.

Figure 4:
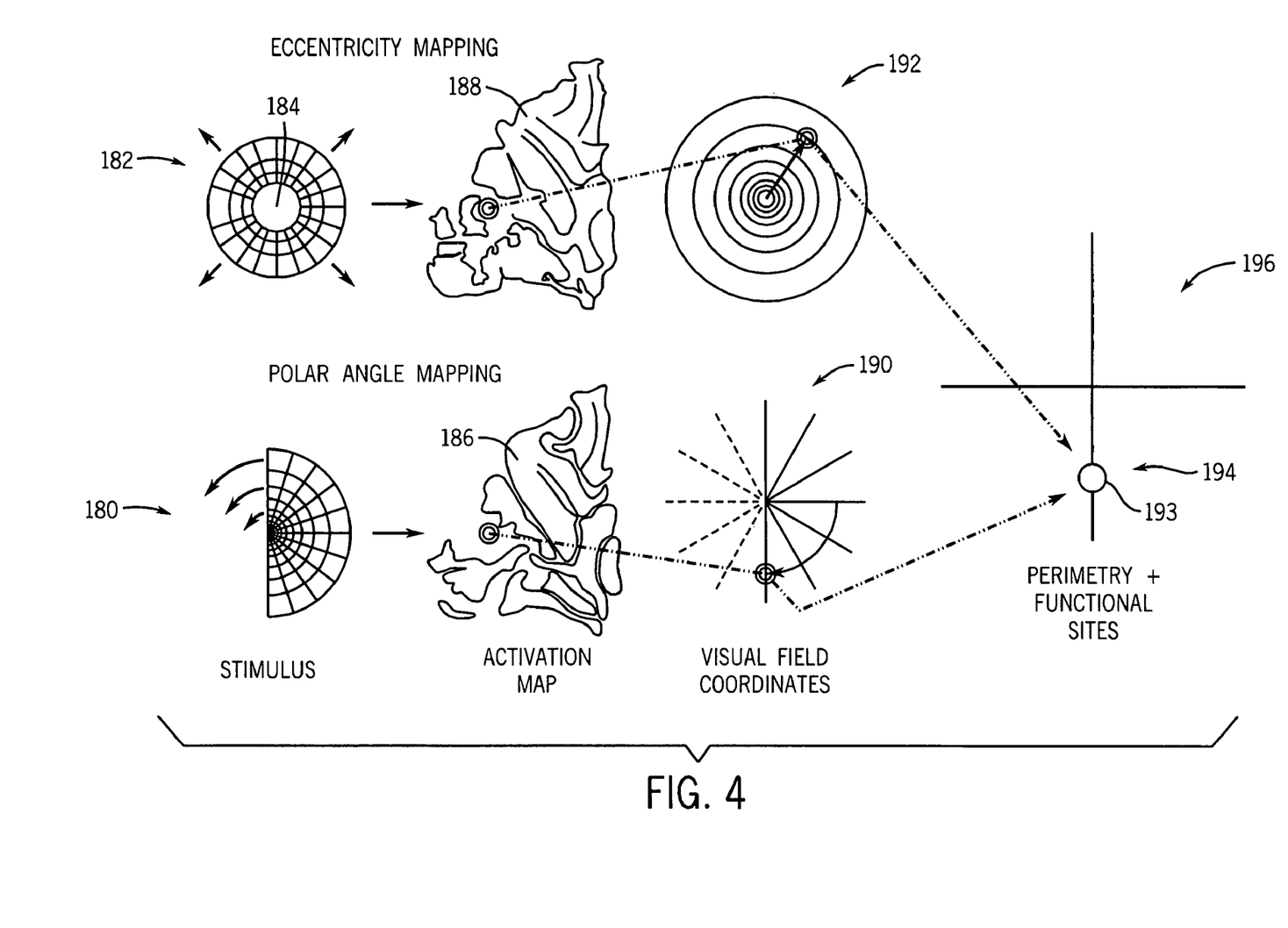
FIG. 4 is a pictorial representation of the process employed to produce a functional field map according to one embodiment of the invention.

In particular, referring to FIG. 4, a display system is positioned in the target area of the scopes 166 and 168 of FIG. 3 to show a checkered hemifield 180 or a checkered annulus 182. More specifically, to map angular positions within the visual field, a flickering, black and while checkered hemifield 180 is displayed and rotated slowly about a central fixation point during the fMRI scan. According to one embodiment the checkered hemifield 180 has a mean luminance of approximately 20 cd/m2 and is rotated at a speed of about one revolution every 40 seconds.

To map visual field eccentricity (distance from the center of gaze), the checkered annulus 182 is displayed and expanded outwardly from a center point 184. According to one embodiment, the rate of expansion of the checkered annulus 182 is not linear. Rather, the distance from the center point 184 as well as the difference between the inner and outer radii (width) of the checkered annulus 182 and the check size are scaled in proportion to mean radius of the checkered annulus 182. Thus, the checkered annulus 182 moves faster, becoming wider and containing larger checks, as it expands from the center point 184. While the rate of expansion of the checkered annulus 182 is not linear, the evoked neural activity in the brain caused by this stimuli is roughly a linear expansion due to the well known principle of "cortical magnification of the fovea". Under this principle, distances near the observer's center of gaze are expanded within the neural maps of visual space in the brain.

The above-described stimulation scheme allows for a more detailed and regular sampling of the cortical map than would otherwise be possible. In this manner, neurons responding to stimulation at different locations in the visual field are activated at different times during the stimulus sequence. Corresponding differences in the temporal phase of the FMRI response can, thus, identify the retinotopic location yielding a maximal response for each active site in the brain. To enhance activation and help maintain attention and arousal, imaging subjects may be required to detect a small target flashed at random positions superimposed on the checkered hemifield 180 or checkered annulus 182, while maintaining fixation.

Cortical sites of significant activation in the subject's brain can be identified by cross-correlating the response waveform for each time course voxel vector with a reference voxel vector in the form of a sine function that closely approximates the ideal response to the visual stimulus smoothed and delayed by the cortical hemodynamics. Under the null hypothesis (no signal present), the cross-correlation coefficient follows an incomplete beta distribution, thereby permitting calculation of a statistical significance, p, based on 96 degrees of freedom in the MR time series (100 minus 4 fit coefficients for the phase and amplitude of the reference waveform). According to one embodiment, a voxel is considered active if it passes a threshold of $p \leq 6.2 \times 10^{-8}$, which corresponds to $r \geq 0.54$ for 96 degrees of freedom. Using a Bonferroni correction for multiple comparisons this is equivalent to $p \leq 0.003$ for the entire brain volume.

In order to construct brain activation maps, all voxels exceeding the criterion may be displayed with the color of each voxel representing the amplitude of the best-fit reference waveform. Additionally, the color scheme can be replaced by one that represents an fMRI measure of visual contrast sensitivity or the results of other vision capability measurements. These measurements may include, for example, the intensity of the subject's visual attention at that visual field location. In any case, the resultant functional images can then be combined with anatomical images and assembled into a combined 3-dimensional, volumetric data set that, if desired, can be displayed. In this regard, the visual stimulation of each location in the subject's field of view may be associated with specific locations/voxels in the visual cortex that are activated. In order to enhance further display and analysis of the imaging data, high-resolution spoiled GRASS structural images at 1.1 mm thickness (TE=6 ms, TR=48 ms, FOV=24 cm, Resolution=256×192, FA=40, and NEX=1) may be obtained in the axial plane for each subject and then used to construct brain models and identify anatomically abnormal cortex.

Still referring to FIG. 4, the fMRI mapping data 186, 188 can be converted into a functional field map that permits direct visualization of the pattern of blindness within the subject's field of view and, as will be described with respect to FIGS. 5-9, may be used with a VDS system to simulate potential, patient-specific, visual field defects. The above-described retinotopic mapping measurements are used to identify visual field eccentricity and polar angle for activating individual voxels in the subject's visual cortex. For each responsive voxel, the checkered hemifield 180 and annulus 182 mapping measurements 186, 188 yield the polar coordinates of the visual field position 190, 192 that, when stimulated in the prescribed pattern, induce an identifiable response. More specifically, to create the functional field map, a symbol 193 is placed at the corresponding coordinates 194 on a diagram of the subject's visual field 196. The color of the symbol 193 is chosen from a pseudocolor scale representing the amplitude of the fMRI response for that voxel. The size of the symbol 193 is scaled according to the estimated 90% confidence zone for the true location of the data point. This procedure is repeated for all responsive voxels or for selected subsets of voxels as desired.

It should be noted, in a fully sighted individual there will be symbols on the functional field map for all locations in the field of view. On the other hand, for patients having localized areas of blindness, there will be few, or no, voxels at the corresponding visual field locations. In accordance with one embodiment, the functional field map 196 is calculated directly from the fMRI signals without reference to their physical location in the brain.

Calibration of the coordinates for the functional field map may require some care. That is, the sluggishness of the cortical hemodynamic mechanisms typically introduces a delay of 6-8 seconds between the onset of visual stimulation and the peak of the evoked fMRI response. This delay translates into a fixed offset in the measured eccentricity and polar angle coordinates for each voxel. Although, in theory, this offset could be different for each voxel, empirical measurement of the variability in the hemodynamic delay indicates that it is constant to within ±3.6 seconds across voxels and across visual areas. To accurately estimate this offset for each subject, the visual field mapping is repeated using both contracting and expanding annuli as well as clockwise and counter-clockwise rotating hemifields. For the hemifields, the rotation cycle starts at the 12:00 position on the superior vertical meridian. Only voxels representing the vertical meridian could have equivalent delays for both clockwise and counterclockwise rotation. Consequently, the combined set of responsive voxels for the two hemifield experiments are searched for voxels having matched phase delays for each direction of rotation. The phase delays for the 10 best matched voxels is averaged and the result are used to calculate the offset between the true phase delay of the stimulus at the 6:00 position and the actual measured phase delay of the best matched voxels. As an independent check, the same computation can be performed for the two annulus experiments. Since both estimates of the offset should agree, the two can be averaged to provide the best estimate from the combined data set.

It should be noted that the above-described system and method for producing a visual stimulus and mapping the cortical representation of the patient's visual field is but one of various systems and methods. For example, it is contemplated that other stimuli and/or other imaging modalities may be utilized to perform the desired mapping. In this regard, the system and method used to generate the mapping of a patient's visual cortex may be varied or substituted without consequence to present invention.

The results of ffmap analysis show that there is a close relationship between the retinotopic organization of medial visual cortex and the pattern of blindness caused by cortical pathology. The analysis accounts for details of the behavioral data such as macular sparing. In fact, the ffmap provides a more accurate prediction of the pattern of visual field defects than can be obtained from consideration of the anatomy of the lesions alone.

An advantage of the ffmap is that the pattern of visual field defects can be estimated directly from the fMRI data without the need to produce an intervening anatomical map of brain activation. Although such brain maps may be created to illustrate the distribution of activity, they are not a requisite step in the creation of the ffmap. Consequently, potential errors associated with the creation of anatomical brain maps are avoided.

The ffmap suggests that the retinotopic organization within eloquent cortex can be somewhat irregular yet still be compatible with the detailed pattern of sighted and blind regions. That is, the voxels representing the points in the functional field map can be re-arranged or even randomly scrambled within the cortex, typically, without affecting the ffmap. Moreover, distortions of the cortical retinotopic maps due to distortions of the anatomy or re-organization will not affect the ffmap unless voxels representing a particular position in the visual field are either added or deleted.

Another advantage of the functional field mapping method is that it can be easily adapted to the display of other visual functions. That is, once voxels in the brain have been indexed to a location in the subject's field of view, other vision assessment procedures that produce activation in those same voxels can be displayed in ffmap format. In particular, as will be described with respect to FIGS. 5-9, the ffmap can be augmented and used in a VDS system to simulate potential, patient-specific, visual field defects.

In particular, once individualized or patient-specific retinotopic maps of the cortical representations of both visual field eccentricity and polar angle have been developed using the above-described or equivalent fMRI technique, the ffmap data can be stored for use with a VDS system. That is, a VDS system is used to simulate a scotoma that might arise as a side-effect of cortical surgery. The VDS is first used to "virtually" remove any affected portion of the subject's cortical visual field map. The modified cortical activity pattern is then used to recompute the corresponding ffmap in order to create a simulation of the effects of surgery on the patient's visual field, that is, to experience the anticipated scotoma.

Figure 5:
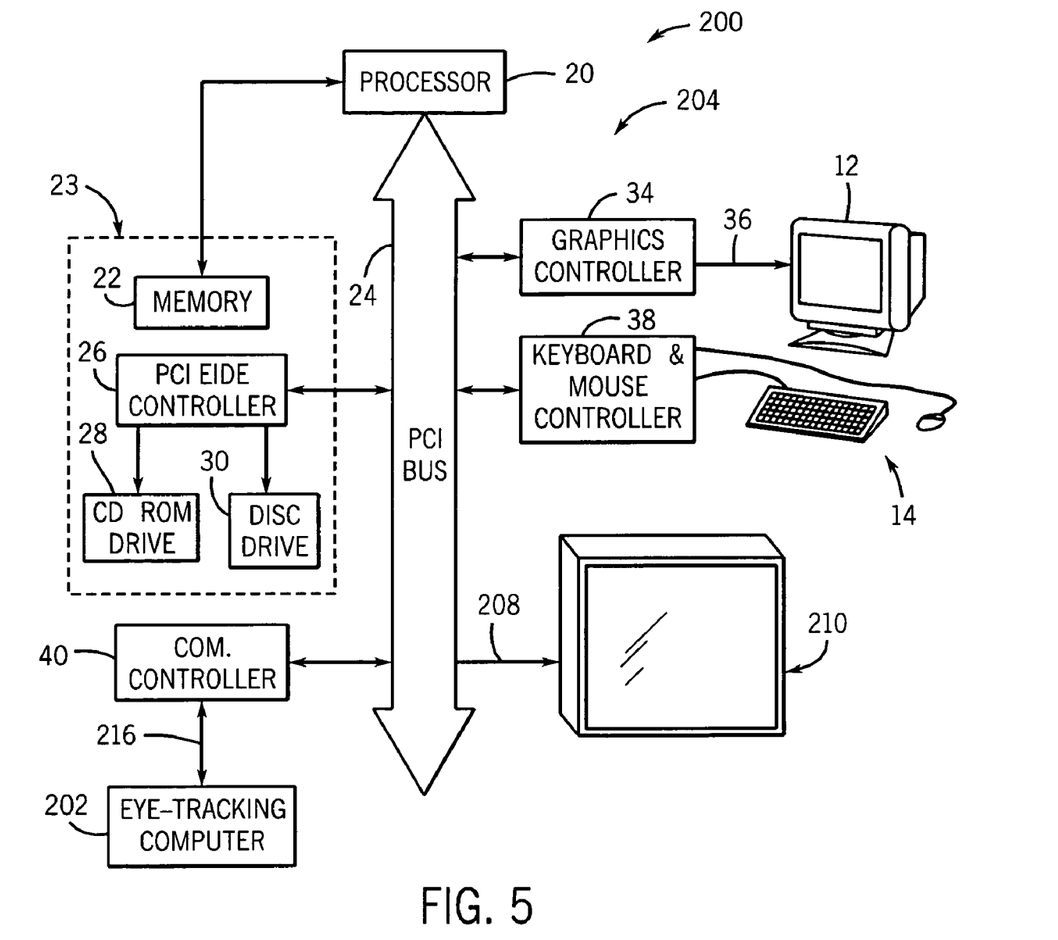
FIG. 5 is a block diagram of a sensory defect simulator system in accordance with the present invention.

Referring to FIG. 5, the primary hardware of a VDS system 200 is shown. The VDS system 200 includes a computer workstation 204, which includes a processor 20 which executes program instructions stored in a memory 22 that forms part of a storage system 23. The processor 20 is a commercially available device designed to operate with any of the numerous computer operating systems and, particularly, with the Windows operating system. Windows is a registered trademark of Microsoft Corp. of Redmond, Wash. It includes internal memory and I/O control to facilitate system integration and integral memory management circuitry for handling all external memory 22. The processor 20 also includes a PCI bus driver which provides a direct interface with a PCI bus 24.

The PCI bus 24 is an industry standard bus that transfers bits of data between the processor 20 and a number of peripheral controller cards. These include a PCI EIDE controller 26 which provides a high-speed transfer of data to and from a CD ROM drive 28 and a disc drive 30. A graphics controller 34 couples the PCI bus 24 to a monitor 12 through a standard VGA or DVI connection 36. A keyboard and mouse controller 38 receives data that is manually input through a keyboard and mouse 14. The PCI bus 24 also connects to a communications controller 40. As will be described is connected to an eye-tracking computer 202.

Images or an ffmap may be downloaded to the workstation 204 from any source connected to the workstation via an intranet or internet or may be accessed on a CD placed in the CD ROM drive. As will be described in detail with respect to FIG. 6, the workstation 204 uses an accessed ffmap and an anatomical brain map to generate a user interface that is shown on the monitor 12 to allow an operator to enter parameters of a procedure that is planned to be performed on a patient. That is, the operator can use the workstation 204 to access a particular patient's brain map and ffmap and enter the parameters of a planned surgical procedure that is to be performed on the patient. The workstation 204 then uses this information to predict a potential visual defect that will result from the planned surgical procedure and, as will be described with respect to FIG. 6, creates a simulation of the predicted visual defect for the subject to experience in real time. It should be noted that the subject may be the patient for which the visual defect is predicted or another user, such as a physician.

Figure 6:
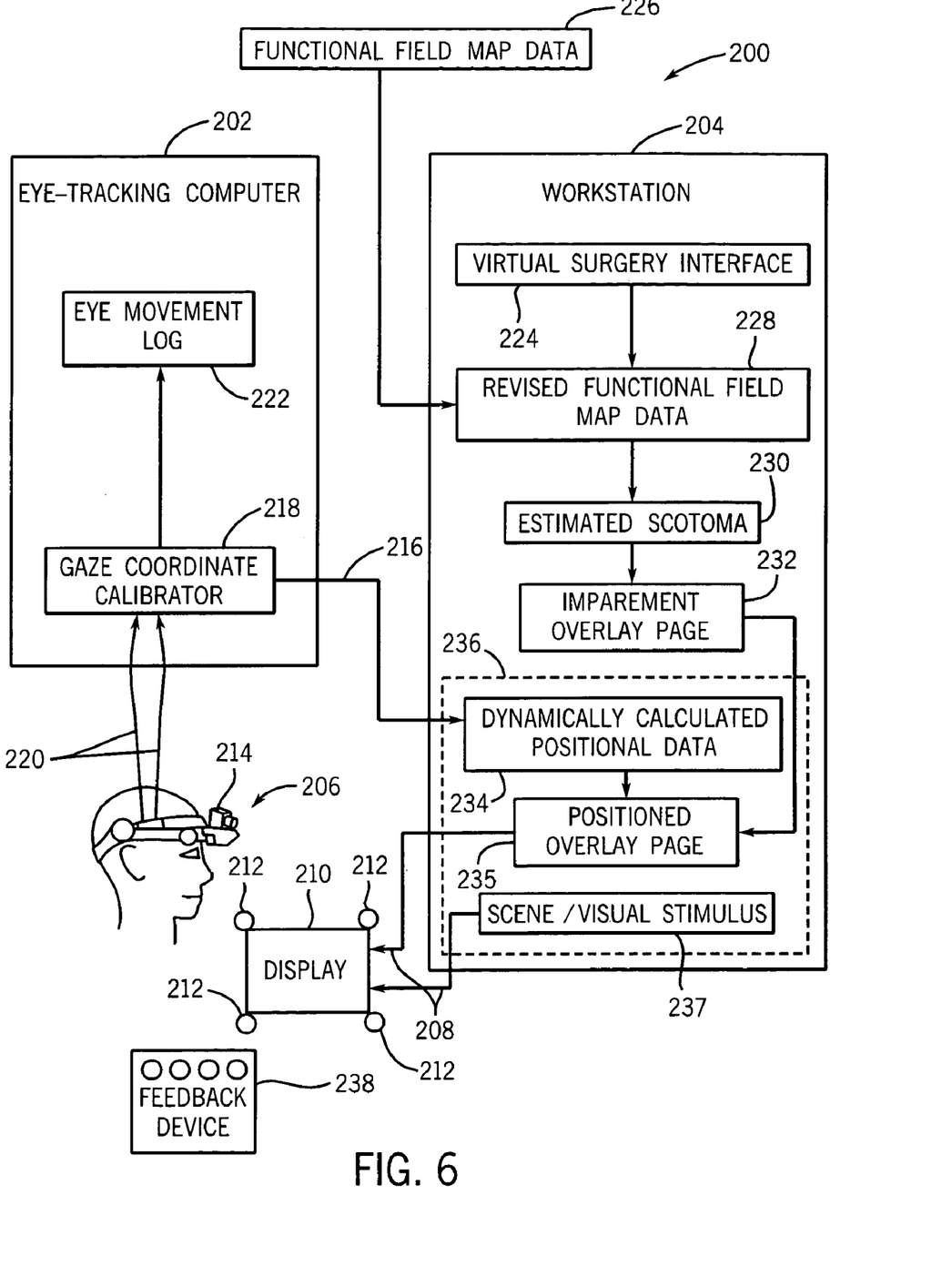
FIG. 6 is a schematic overview of the hardware and associated software architecture of the sensory defect simulator system of FIG. 5.

Referring now to FIG. 6, a schematic of the above-described hardware of the VDS system 200 is shown along with the associated software architecture. The VDS system 200 includes the workstation 204 and the eye-tracking computer 202. The eye-tracking computer 202 is configured to control an eye-tracking system 206 and the workstation 204 is configured to produce visual display data that is outputted via video links 208 to a display 210. In accordance with one embodiment, the eye-tracking system 206 is an EyeLink II high-speed eye tracker that is used to monitor gaze position. EyeLink is a registered trademark of SR Research Ltd. Corp. of Ontario, Canada. According to one embodiment, a head mounted eye-tracking system 206 is used to track pupil position, corneal reflections, or both. In this regard, it is contemplated that the eye-tracking system 206 can compensate for subject head motions of ±15' using four infrared emitters 212, one at each corner of the display, and an infrared camera 214 on the eye tracking headband. According to one embodiment, the subject's head is restrained using a bite stick and head supports to maintain the accuracy of the scotoma position and size as viewed on the video display. Alternatively, it is contemplated that a head restraining eye-tracking system may be used.

According to one embodiment, one or both of the computers 202, 204 are configured to include a minimized version of the Windows 98 operating system or other operating system configured to ensure uninterrupted data acquisition and accurate timing, particularly on the eye-tracking computer 202. Windows is a registered trademark of Microsoft Corp. of Redmond, Wash. Furthermore, according to one embodiment, the display 210 is a 48×35.5 cm LCD computer screen such as is available from AmTRAN Technology Co. Ltd., Taiwan.

A dedicated communications link 216, such as an Ethernet link, connects the computers 202, 204 to communicate data from the eye-tracking computer 202 to the workstation 204. Therefore, while the eye-tracking computer 202 includes a gaze coordinate calibrator 218 to calibrate uncalibrated gaze coordinates sent from the eye-tracking system 206 within a Cartesian plane and an eye movement log 222 to store each calibrated gaze coordinate, this information is readily available to the workstation 204 via the communications link 216.

The workstation 204 includes a virtual surgery interface 224 that is configured to receive parameters of a planned surgical or therapeutic procedure. That is, the virtual surgery interface 224, as will be described, allows a user to plan and perform a virtual surgery on the monitor 12 of FIG. 5. The parameters of the virtual surgery entered by the user with keyboard and mouse 14 of FIG. 5 through the virtual surgery interface 224 are then used to modify ffmap data 226, generated as described with respect to FIGS. 1-4, to generate revised functional field map data 228 that represents an ffmap that is predicted to result from the parameters entered via the virtual surgery interface 224. From the revised functional field map data 228, the workstation 204 generates estimated scotoma 230 that can be correlated into an impairment overlay 232. The impairment overlay 232 is an image of the patient's visual field map generated from the above-described ffmap. According to one embodiment, the impairment overlay 232 is an 8-bit grayscale image.

As will be described, a video display generator 236 uses dynamically calculated position data 234 to determine the proper positioning of the impairment overlay 232 over a background page or scene 237 in order to simulate the predicted scotoma resulting from the proposed or virtual surgery. That is, using the dynamically calculated position data 234, the video display generator 236 creates a positioned overlay page 235 that is sent via the communications link 208 to the display 210 to present the simulated scotoma to the subject. According to one embodiment, the video display generator 236 is a VSG2/5 Visual Stimulus Generator as is available from Cambridge Research Systems Ltd., Kent, England.

In particular, the workstation 204 receives information from the gaze coordinate calibrator 218 via the communications link 216. The workstation 204 uses the coordinate calibrated, gaze tracking data received via the communications link 216 to compute the dynamically calculated position data 234 that dictates the position of the impairment overlay 232 with respect to the scene 237. In this regard, the video display generator 236 creates a properly positioned overlay page 235 that is combined with the scene image 237 on the video display 210 to prevent a simulation of a visual defect.

It should be recognized that the components of the computers 202, 204 are shown as modules for purposes of illustrating some of the primary software components operating on the computers 202, 204 and may be functionally, communicatively, or organizationally different than illustrated. In this regard, it is contemplated that the above-described software be embodied in one or more programs, such as may be written in Boreland Builder C++ 6.0, that are designed to use software libraries associated with the EyeLink eye-tracking system and VSG2/5 Visual Stimulus Generator to integrate the eye-tracking system 206 with the video display generator 236.

Additionally, as will be described, a feedback device 238 may be included to collect subject responses, such as identifying certain portions of the visual stimulus shown on the display 210 by pressing a designated button. In accordance with one embodiment of the invention, the feedback device 238 is a game pad such as plug and play game pad as available from the Microsoft Corporation, Redmond, Wash.

In operation, the functional field map data 226 for a patient is downloaded to the workstation 204 from the MRI system of FIG. 1 or from storage. Typically, the workstation and eye-tracking computer 202 are located remotely from the MRI system. When the VDS system 200 is to be operated, a user communicates with the mouse and keyboard 14 of FIG. 5 and through the virtual surgery interface 224, to control the VDS system 200. When running a simulation, the user provides the VDS system 200 with a file name from which to create the subject's scotoma and a name for the eye movement log 222. The VDS system 200 generates the scotoma simulation automatically based on the augmentations desired to the functional field map data 226.

The user can graphically or textually input the augmentations desired to the ffmap data 226 by communicating the parameters of a planned surgery through the virtual surgery interface 224. This is done by indicating the regions in the subject's brain that are to be treated. An image of the subject's brain is displayed on the monitor 12 of FIG. 5 and a treatment region is designated using the mouse and keyboard of FIG. 5. Responsive thereto, the functional field map 226 is altered to reflect the changes that will occur due to the planned treatment and a revised functional field map 228, scotoma data 230, and impairment overlay 232 are automatically produced. Once eye tracking data is available from the eye-tracking computer 202, the dynamically calculated position data is created and the properly positioned impairment overlay 232 and the scene 237 are sent by the video display generator 236 to the display 210 to simulate the potential, patient-specific, visual field defects in the form a potential scotoma that could result from the proposed treatment. That is, the workstation 204 uses the calibrated (x, y) gaze coordinates provided by the gaze coordinate calibrator 218 of the eye-tracking computer 202 to superimpose the previously computed impairment overlay 232 over the scene 237 in the correct position.

To allow the simulated scotoma to appear at a fixed retinal location, that is, to move with the eyes, the simulated scotoma presented on the display 210 is continuously updated based on high speed measurements of the subject's gaze position using the eye-tracking system 206. Depending on which tracking mode is used, the eye-tracking system 206 can sample at 250 Hz for corneal reflection tracking or 500 Hz for pupil tracking with an average data transit delay (time required to send the data to the workstation 204) of 5 milliseconds or 10 milliseconds, respectively. According to one embodiment, the refresh rate of the display 210 is 60 Hz (16-millisecond/refresh) and, as a result, the 10-millisecond data transit delay provides a sufficient buffer above the monitor refresh rate. That is, a 60 Hz refresh rate is generally fast enough to maintain the scotoma position perceptually locked with the subject's tracked gaze position. However, it is contemplated that the visual display generator 236 may include an embedded microprocessor with self-generated timing signals for synchronizing the display 210 at frame-rates up to 500 Hz.

Figure 7:
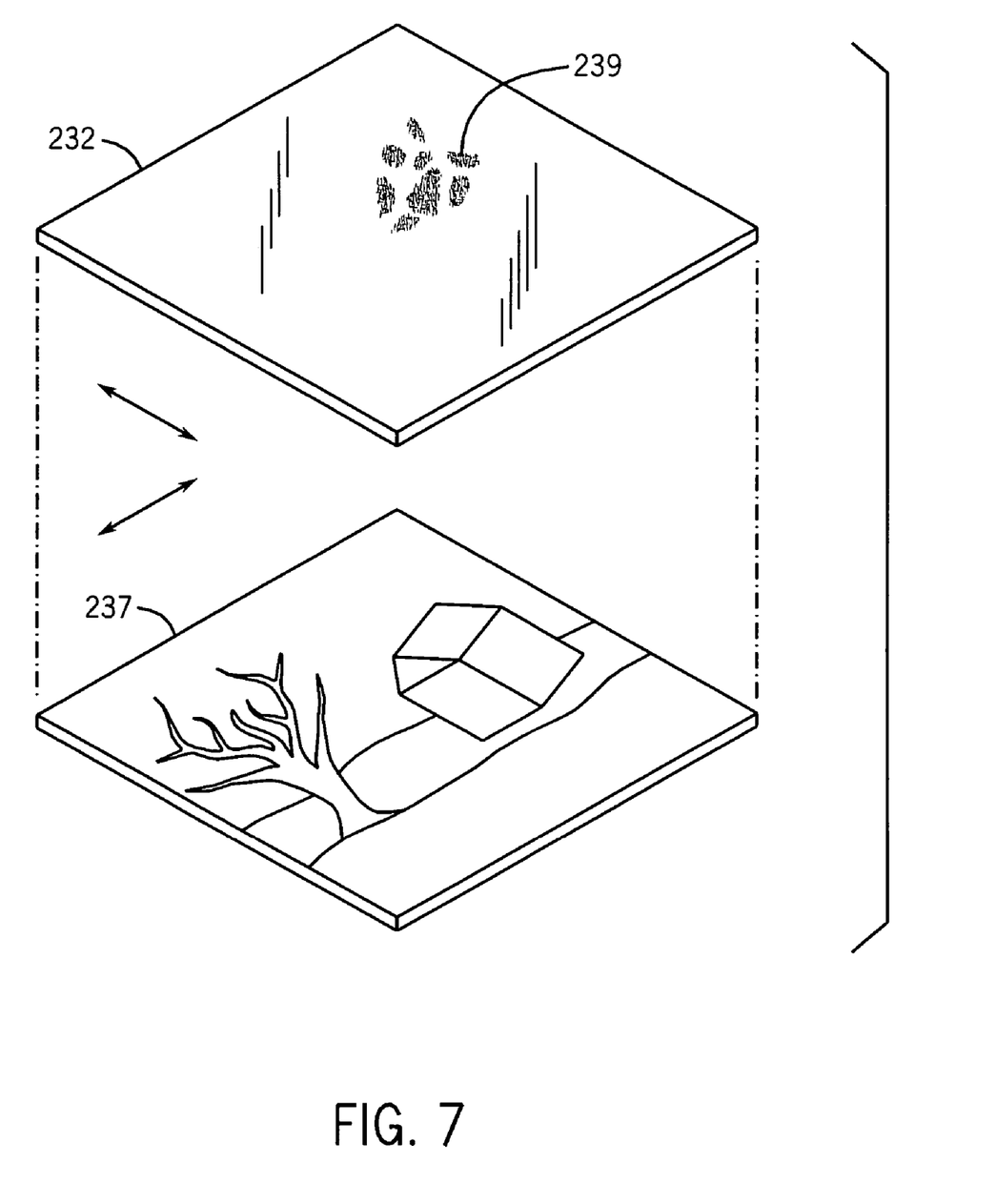
FIG. 7 is a perspective view showing the functional relationship of the impairment overlay page and scene of FIGS. 5 and 6.

Referring now to FIG. 7, a perspective view showing the relationship of the impairment overlay 232 and scene 237 of FIGS. 5 and 6. As shown, the impairment overlay 232 is a "layer" that is placed over the scene 237. In this regard, the impairment overlay page 237 and scene 237 are analogous to layers within graphic arts software program. Accordingly, the transparency of impairment overlay 232 can be controlled to simulate blind spots or scotoma 239. That is, by varying the relative number of opaque pixels in proportion to the grayscale value of the scotoma image, gradations in visual function are formed in the composite image of the impairment overlay 232 and the scene 237 shown to the patient.

In accordance with one embodiment, each pixel of the impairment overlay 232 can be either opaque or transparent. However, by varying the relative numbers of opaque or transparent pixels in a given area of the impairment overlay 232, the perceived transparency within a region can be controlled to form the simulated scotoma 239 by occluding the scene 237.

Furthermore, the entire impairment overlay 232 can be moved relative to the scene 237 as directed by the aforementioned dynamically calculated position data 234 of FIG. 6. In this regard, the impairment overlay 232 is moved relative to the scene 237 based on the subject's gaze across the stationary scene 237 to retinopically fix the scotoma 239. That is, by moving the simulated scotoma 239 based on the subject's position of gaze within the scene 237, the subject perceives the simulated scotoma 239 as moving as the eyes move across the field of view.

Figure 8A:
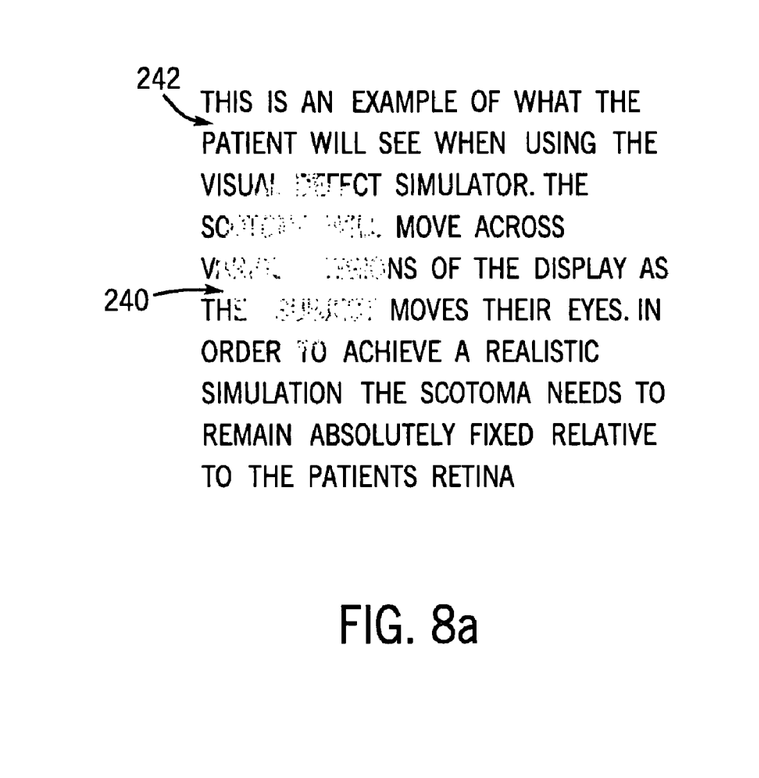
FIGS. 8a and 8b are representative images created by the sensory defect simulator system of FIGS. 5 and 6.
Figure 8B:
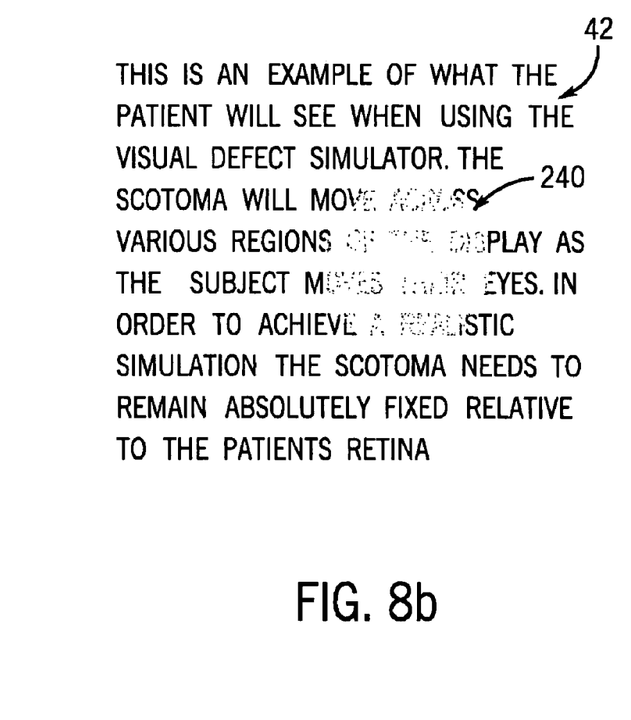

An example of an impairment overlay page superimposed over a textual background page to create a combined image forming a scotoma simulation is shown in FIGS. 8a and 8b. As shown, a scotoma 240 that could be potentially perceived by a particular subject as a result of a proposed surgery plan forms an obstruction in a text background 242. The scotoma 240 is shown in FIG. 8a in a first position with respect to the text background 242, which corresponds to a first subject gaze position. As shown in FIG. 8b, as the subject's gaze moves over the text background 242, the scotoma 240 is adjusted to a second position. In this regard, the simulated scotoma 240 appears to the subject at a fixed retinal location (variable scene location) by tracking changes in the subject's gaze and moving the scotoma 240 by a corresponding change over the background text 242. A variable "blurring" of the underlying background text 242 is provided within those parts of the scotoma 240 imparting a partial vision loss. The above-described VDS system also takes into account the subject's viewing distance to ensure that the scotoma overlay is appropriately scaled on the video display.

To ensure that the above-described VDS system would provide a clinically valuable simulation of a predicted scotoma, a variety of tests were performed that showed that the VDS system provides a highly accurate scotoma simulation. In particular, to quantify the gaze resolution and to detect drift in the measured eye position over time, data was collected with the eye-tracking system in an immobile model eye. Data was collected from the immobile eye in pupil tracking mode for 5 minutes at 500 Hz. The average (±standard deviation) recorded gaze coordinates were approximately X=400 (±0.573) pixels and Y=300.266 (±0.323) pixels. These maximum deviations corresponded to ±0.15 and ±0.1 degrees of visual angle in the horizontal and vertical directions respectively. In this regard, there was a negligible systematic drift in the system over a the tested time duration, which illustrated that the VDS system can measure gaze position accurately.

Figure 9:
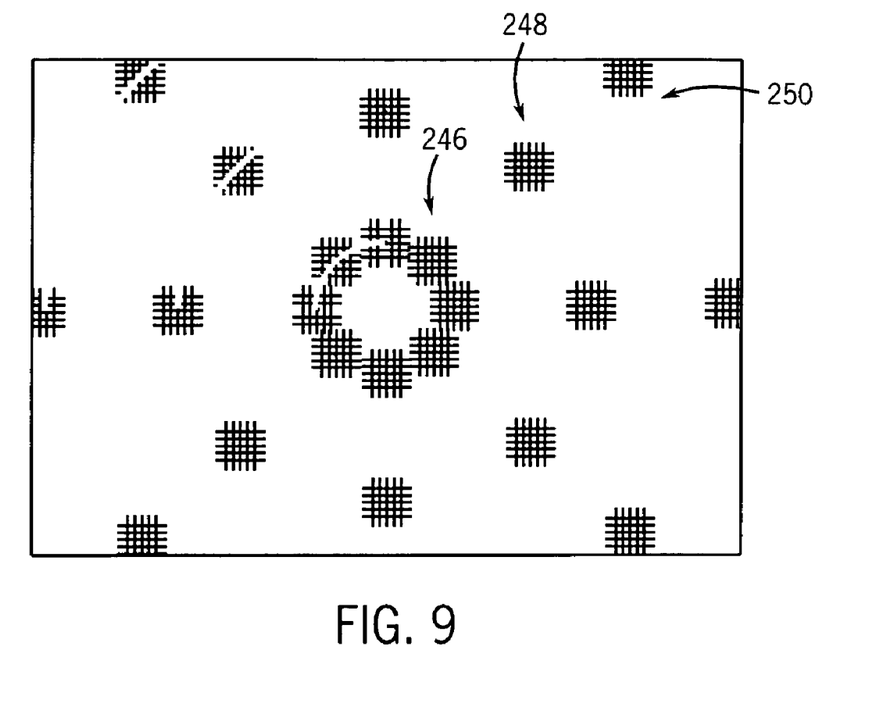
FIG. 9 is a display usable with the sensory defect simulator system of FIGS. 5 and 6 to quantify gaze tracking accuracy.

Additionally, referring to FIG. 9 a test display was used to determine the dynamic gaze tracking accuracy of the VDS system when used with a real eye. The test display included three concentric rings 246, 248, 250 of eight targets positioned at distances from the center of gaze equal to 5°, 15°, and 25° of visual angle. Due to the display dimensions listed above, the topmost and bottommost targets on the 25° ring 250 were not shown. To assess gaze position accuracy, a subject was asked to look at the center of each of the targets in succession. An optional, small fixation marker, such as a white cross, showing the measured gaze position was displayed on the screen in real-time based on the data from the eye-tracking system. This marker allowed immediate qualitative assessment of the gaze tracking accuracy and update speed of the VDS system. Once the subject fixated on the center of each target, the subject pressed a button of the above-described feedback pad so that the gaze position accuracy could be assessed later offline. It was noted that data can be collected both with and without using the fixation marker, typically, with no change in the gaze position error between the two conditions. In this regard, the error in gaze position was calculated for the x-coordinates and the y-coordinates separately according to:

$$\text{errors} \approx \frac{|P_{actual} - P_{measured}|}{\text{Pixels/degrees}}. \qquad \text{Eqn. 1}$$

Where $P_{actual}$ is the actual position of each target on the screen and $P_{measured}$ is the gaze position measured with the eye-tracking system, expressed in pixel values for each target. The error values were then be converted to degrees and averaged across all targets for each eccentricity 246, 248, 250 (5°, 15°, or 25°) to determine the error as a function of distance from screen center.

Figure 10:
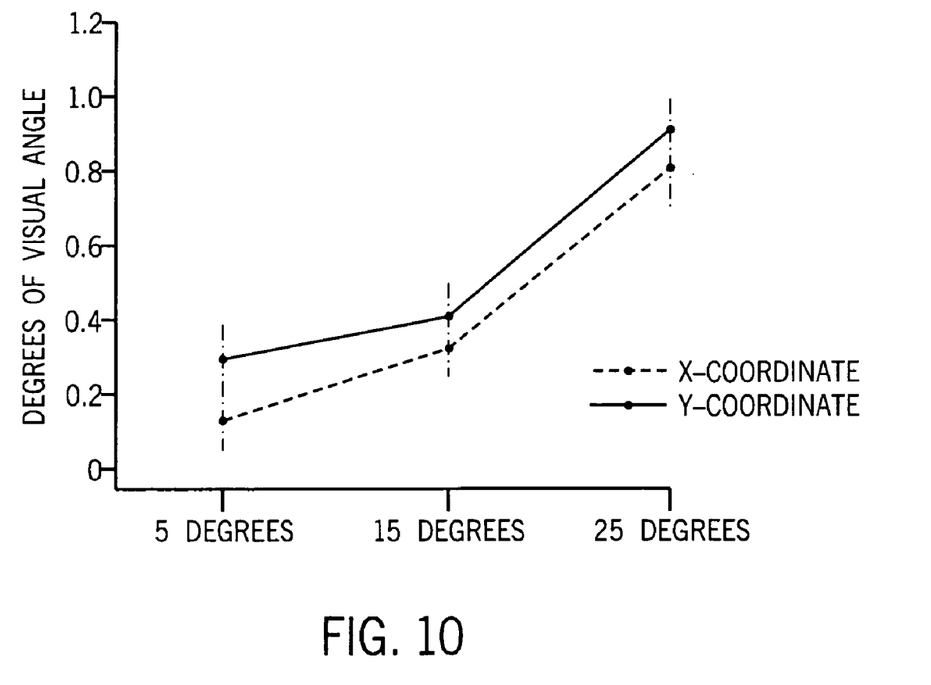
FIG. 10 is a graph showing scotoma position error as a function of eccentricity for the sensory defect simulator of FIGS. 5 and 6.

According to one such test, a minimum of 24 trials were recorded for each of the three eccentricities, and a minimum of 143 fixations were averaged for each eccentricity. Resulting therefrom, the VDS system gaze position collected for the gaze accuracy analysis showed increasing error with eccentricity, with disproportionately larger errors at the 25° ring 250. The best-fit linear regression for the x-coordinate error was y=0.1548x+0.0645 and the y-coordinate error was y=0.1699x+0.144. The R2-values were 0.95 and 0.86 respectively. As such, it was determined that a visual range of ±20° from the screen center provided a desired accuracy of <0.5° verses an accuracy of <0.75° throughout the entire testing range. In particular, the scotoma position error as a function of eccentricity for the above described test is shown in FIG. 10.

Finally, a test was performed to asses the overall accuracy of the scotoma simulation to determine whether the simulated scotoma provided a realistic experience for the user. Previous research has shown that patients with real scotomata can have significant alterations in their ability to read. Typically, these alterations manifest as disruptions in eye movement patterns during the reading process. Consequently, to assess the efficacy of scotoma simulation, eye movements were examined as a reflection of reading ability in healthy subjects with and without a simulated hemified deficit (HFD) either to the left or right of fixation. In particular, reading speed, number of fixations per line, and number of "return" saccades (saccades from end of one line to start of the next) were measured.

According to one test, five volunteers with no known visual defects were studied. The testing started with a calibration procedure. In particular, the subjects were asked to attain steady fixation on each calibration point as it appeared. When the system detected a stable eye-fixation, the current calibration point disappeared and the next dot appeared randomly at one of the 13 locations. This self-paced calibration procedure ensured that the subjects fixated on each location and no targets were skipped. To determine the accuracy of the calibration, the procedure was repeated and the difference between the two measurements was compared. If the maximum variation between measurements for any of the 13 points was more than one degree, the calibration process was restarted. Between each trial a brief drift correction procedure occurred, in which the subjects pressed a button while fixating on a single dot in the center of the screen.

Eye movements were recorded while each subject read an excerpt of a short story composed of vocabulary of approximately a high school reading level. Each subject read two pages of text with a simulated right HFD, a simulated left HFD, and no deficit. Each of the six pages of text had six double spaced lines of black text on a light gray background. The text was presented in Times New Roman font and each character subtended 1.25° of visual angle on the display (1.5 cm high, viewed from 68.5 cm). The representations of the scotomata were the same color as the background. The subjects were self-paced and told to read and comprehend each page but to not go back and re-read lines of text. The eye movement recordings were inspected after the test and no subjects returned to lines of text they had already read after starting the next line. However, leftward saccades within a given line were allowed. Subjects proceeded to the next page of text by pressing a button. For the first four pages the subjects alternated between right and left HFDs on a page-by-page basis and finished the test by reading two pages without a scotoma. The simulated HFDs completely obscured one side of the visual field with no central sparing. The eye tracking data was recorded and stored off-line for later evaluation. The test session took approximately 10 minutes including set-up, calibration and data collection.

Data was grouped for each line of text and then collapsed across the subjects according to scotoma condition. The minimum duration for a fixation was defined as 50 milliseconds. An analysis of variance was performed for reading speed, fixations per line, and number of return saccades with the scotoma type as the between category variable (n=3, m−3). Post hoc analysis using test data was performed to determine significance between the conditions (group a-level=0.01).

For individuals who read left-to-right, visual information extending approximately 5° to the right of fixation is used for saccade planning. When visual information to the right of fixation was not available, as is the case with a right HFD, saccades tended to be more erratic and span fewer degrees of visual angle. As a result the individual produced many more saccades forward, backward, up, and down when reading a line of text. This trend is reflected in the data as a significantly increased total number of fixations and decreased reading speed, with the right HFD condition as well as lesser deviations from control with the left HFD condition. Similarly, individuals with left HFDs had particular difficulty locating the beginning of each new line of text. Without the left hemifield visual information, subjects tend to "get lost" on the return saccade. The data reflected this behavior with an increased number of return saccades when reading with the left HFD.

Figure 11A:
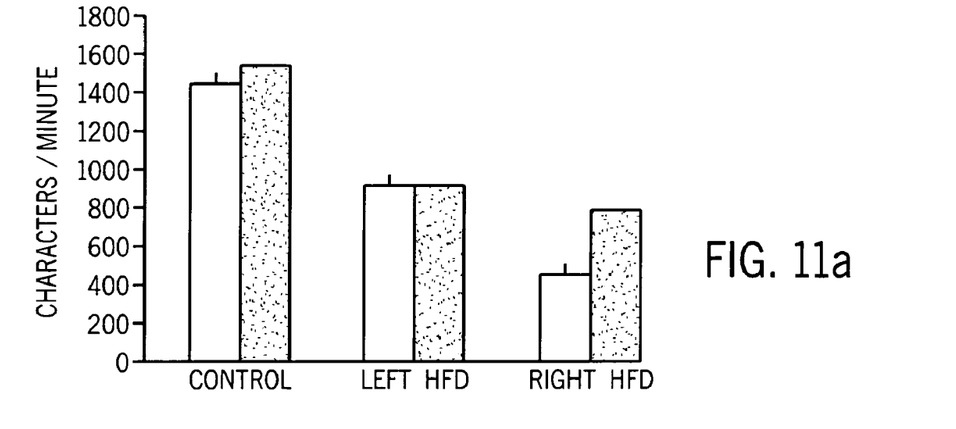
FIGS. 11a, 11b, and 11c are graphs showing experimental results of tracked eye movements of subjects with sensory defects simulated using the sensory defect simulator system of FIGS. 5 and 6, represented by unshaded bars, along with tracked eye movements of subjects with actual sensory defects, represented by shaded bars.
Figure 11B:
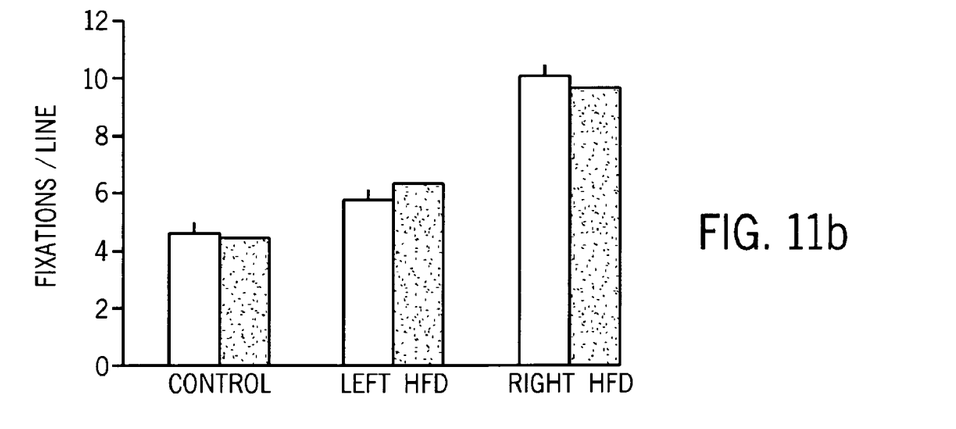
Figure 11C:
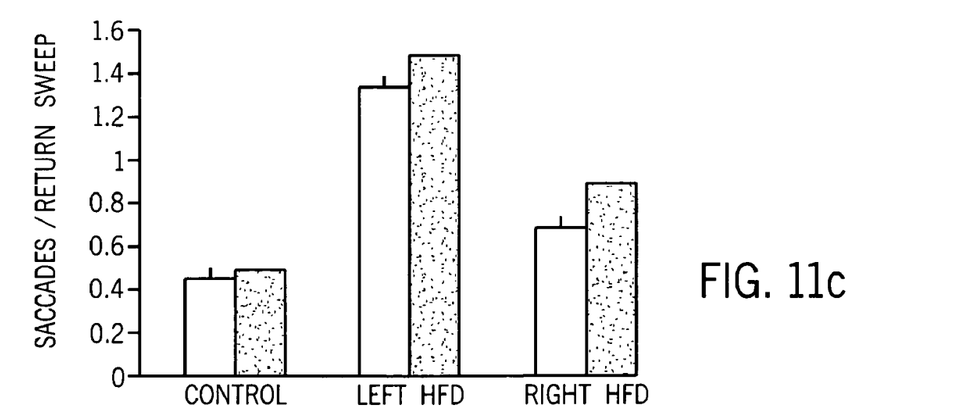

As shown in FIGS. 11a, 11b, and 11c, according to this test, all three eye-movement characteristics showed significant differences in the presence versus absence of a scotoma. As shown in FIG. 10a, reading speed in characters per minute was reduced to only 31% of control with the right HFD and to 63% of control for the left HFD. Referring to FIG. 10b, the number of fixations per word increased 118% beyond control with the right HFD and 43% beyond control for the left HFD. Furthermore, as shown in FIG. 10c, the number of saccades per return sweep increased 50% beyond control with the right HFD and 195% beyond control with the left HFD. For the number of saccades on the return sweep, the right and left HFD conditions differed significantly from each other, but only the left HFD condition was significantly different from control.

The data from healthy subjects were also compared with previously published data from patients with actual HFD's. However, in the VDS simulation, the subjects read lines of text that subtended approximately twice as many degrees of visual angle as those read by the patients in the comparison study.

Overall the eye-movement patterns seen in the data from healthy subjects were also compared with previously published data from patients with actual HFDs and the two were similar. However, there was a greater reduction in reading speed with the right HFD for subjects in the VDS system than for the patient with actual HFDs. This discrepancy can likely be explained by the fact that patients with HFDs are known to develop compensatory behavioral strategies over a period of months and the behavioral compensations result in increased reading speed over time. The subjects using the VDS system did not have these behavioral compensations and, as a result, the right HFD caused a more pronounced reduction in reading speed. However, even with the differences in compensatory behaviors between the two populations, the two data sets show markedly similar patterns, indicating that the VDS system accurately simulates the experience of reading with a scotoma.

The use of longer lines in the VDS system simulation more thoroughly tested the system throughout its intended operating range. However, the longer line length resulted in an overall increase in the number of fixations per line and number of return saccades while the relative differences across conditions remained the same. As such, to facilitate comparisons between the VDS system data and the data from actual HFD, the VDS values for fixations per line and return saccades were scaled by one half. Reading speed was not affected by the line-length discrepancy and, so, was not scaled. All statistical analyses were performed with the original data prior to any scaling. The similarity between the data for the simulated scotomata and the real scotomata attest to the accuracy of the simulation, at least for reading performance.

The whole of the above-listed test results indicate that the above-described VDS system can produce a realistic scotoma simulation. Accordingly to one configuration and test, the scotoma positioning is at least accurate to within approximately one half of a degree in the central portion of the display, and within one degree at the edges of the display. This level of precision is sufficient to produce useful scotoma simulations for pre-surgical planning. The data used in the error analysis presented above were recorded with a bite-stick but without any other head restraints in order to determine a conservative estimate of system performance. However, it is contemplated that additional head restraints could serve to further reduce the error in scotoma positioning. Also, to achieve increased accuracy, the test passage can be confined to ±20° from the screen center. In the above-described system, the central region corresponds roughly to a standard magazine page viewed from a distance of 24 inches.

Reading and other tasks that require high-acuity central vision are very sensitive to the eccentricity of the scotoma as it encroaches upon the fovea. Previous research has shown little impairment of reading ability when the patient has the fovea and at least 5° of spared visual function to the right of the fovea. In some cases, minor changes in a surgical procedure may make it possible to increase the region of preserved right para-foveal visual function and, as a result, greatly improve the patient's post-surgical visual experience.

By using the VDS system in conjunction with fMRI, various treatment options and their impact on vision can be explored prior to performing invasive brain surgery. If used as part of an iterative process to explore a range of treatment options, the VDS system can be used as a constructive part of the pre-surgical planning process.

As described above, the VDS system can operate throughout at least approximately 60° of the visual angle. For tasks, such as reading, that rely primarily on central vision and that are very dependent on scotoma size and location, the above-described VDS system potentially provides a quantitative method of determining the impact of a given treatment plan. The invasive treatment of cortical pathologies, whether life threatening or not, can involve critical decisions concerning compromises between treatment efficacy and quality-of-life. The above-described VDS system can help individuals to make more informed decisions when visual function is at stake. By using the above-described VDS system, patients and physicians can directly experience potential visual side-effects before undergoing treatment, thereby allowing them to better appreciate the compromises they face and to become more active in the decision process.

Additionally, the ease of use of the above-described VDS system makes it a valuable tool for providing first-hand experience of macular degeneration, cataract vision loss, diabetic retinopathy, or other visual losses to individuals. This may enable subjects to self-detect vision loss associated with these aliments and seek treatment sooner.

Therefore, the present invention provides a system and method to provide a subject with a first-hand, simulated experience of a potential/predicted visual defect that is specific to both the subject and the proposed form of treatment.

Therefore, one embodiment of the invention includes a method for simulating a visual defect produced by a planned operation on a subject's brain. The method includes producing a functional field map that relates locations in the subject's field of view to regions in the subject's brain and designating regions in the subject's brain that are affected by the planned operation. The method also includes producing a revised functional field map that indicates locations in the subject's field of view that are affected by the regions designated in the subject's brain. The method further includes displaying a scene that substantially fills the field of view of a user and altering the displayed scene at locations therein determined by the locations indicated in the subject's field of view that are affected by the regions designated in the subject's brain.

According to another embodiment of the invention, a visual defect simulation system includes a functional field map of a brain of a subject and a user input configured to receive parameters indicating a proposed process to be performed on the subject's brain. The system also includes a processor receiving the parameters from the user input and the functional field map and being operable to predict at least one visual defect that will result from the proposed process and a display coupled to the processor for displaying an image simulating the at least one visual defect.

According to yet another embodiment of the invention, a visual defect simulation system includes means for receiving a functional field map that relates locations in a subject's field of view to regions in the subject's brain and means for designating regions in the subject's brain that are to be affected by a planned operation. The system also includes means for producing a revised functional filed map that indicates locations in the subject's field of view that will be affected by the planned operation and means for simulating the subject's field of view with visual defects at the locations in the subject's field of view that will be affected by the planned operation.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment.

We claim:

1. A method for simulating a visual defect produced by a planned operation on a patient's brain, the method comprising the steps of:
   a) producing a functional field map that relates locations in the patient's field of view to regions in the patient's brain;
   b) designating regions in the patient's brain that are affected by the planned operation;
   c) producing a revised functional field map that indicates locations in the patient's field of view that are affected by the regions designated in step b);
   d) displaying a scene that substantially fills the field of view of a user; and
   e) altering the displayed scene at locations therein determined by the locations indicated in step c).

2. The method of claim 1 wherein the functional field map is produced by acquiring data with a magnetic resonance imaging (MRI) system.

3. The method of claim 1 wherein step e) further includes producing an overlay displayed over the scene and having pixels corresponding to locations in the patient's field of view in which at least one of a transparency and a color of the pixels are determined by the revised functional field map.

4. The method of claim 3 further comprising the steps of: f) detecting eye movements of a user viewing the displayed scene; and g) translating a position of the overlay relative to the displayed scene in response to the detected eye movements.

5. The method of claim 3 wherein step d) further includes forming the displayed scene to include a first colored text arranged on a second colored background and step e) includes forming the overlay to include opaque pixels in the second color to alter the displayed scene by obscuring portions of the first color text.

6. The method of claim 1 further comprising the steps of: f) tracking eye movements of the user viewing the displayed scene; and g) adjusting a position of the locations of the alterations to the displayed scene to provide a retinopically fixed simulation of a potential visual defect to the user.

7. The method of claim 6 wherein the user is the patient and the potential visual defect is a predicted result of the planned operation.

8. A visual defect simulation system comprising:
   a functional field map of a patient's brain;
   a user input configured to receive parameters indicating a proposed process to be performed on the patient's brain;

a processor for receiving the parameters from the user input and the functional field map and being operable to predict at least one visual defect that will result from the proposed process; and a display coupled to the processor for displaying an image simulating the at least one visual defect.

9. The system of claim 8 wherein the display produces a background scene and a foreground impairment overlay, the impairment overlay including at least one opaque portion obscuring a portion of the background scene to simulate the at least one visual defect.

10. The system of claim 9 further comprising: an eye-tracking system for monitoring a user viewing the display and producing feedback to the processor indicating movement of the user's eyes; and wherein upon receiving feedback from the eye-tracking system, the processor dynamically adjusts a position of the impairment overlay with respect to the background scene to retinopically fix the at least one visual defect in the user's field of view.

11. The system of claim 8 wherein the at least one visual defect is a retinopically fixed scotoma.

12. The system of claim 8 wherein the proposed is a surgical process and wherein the at least one visual defect is a predicted result of the surgical process.

13. The system of claim 8 wherein the processor produces a revised functional field map that predicts the at least one visual defect.

14. The system of claim 13 wherein the revised functional field map indicates locations in the patient's field of view that will be affected by the proposed process.

15. A visual defect simulation system comprising:
means for receiving a functional field map that relates locations in a patient's field of view to regions in the patient's brain;
means for designating regions in the patient's brain that are to be affected by a planned operation;
means for producing a revised functional field map that indicates locations in the patient's field of view that will be affected by the planned operation; and
means for simulating the patient's field of view with visual defects at the locations in the patient's field of view that will be affected by the planned operation.

16. The system of claim 15 wherein the means for simulating includes means for displaying a scene with the visual defects superimposed thereon.

17. The system of claim 16 further comprising:
means for tracking a gaze of a user viewing the means for displaying; and
means for adjusting a position of the visual defects superimposed on the scene based on feedback from the means for tracking to substantially fix the visual defects in a location within the user's field of view corresponding to the locations in the patient's field of view that will be affected by the planned operation.

18. The system of claim 17 further comprising means for generating a log of feedback generated by the means for tracking.

19. The system of claim 17 further comprising means for assigning coordinates to feedback generated by the means for tracking.

20. The system of claim 15 further comprising means for generating a representation of the patient's brain from the functional field map.

* * * * *